United States Patent
Yagi et al.

(10) Patent No.: US 9,939,638 B2
(45) Date of Patent: Apr. 10, 2018

(54) VEHICLE DISPLAY DEVICE

(71) Applicant: Yazaki Corporation, Tokyo (JP)

(72) Inventors: Kennji Yagi, Shizuoka (JP); Akihiro Ohata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/238,893

(22) Filed: Aug. 17, 2016

(65) Prior Publication Data

US 2016/0357015 A1 Dec. 8, 2016

Related U.S. Application Data (63) Continuation of application No. PCT/JP2015/058118, filed on Mar. 18, 2015.

(30) Foreign Application Priority Data

Mar. 19, 2014 (JP) ................................. 2014-056710

(51) Int. Cl.
*G09G 5/00* (2006.01)
*G02B 27/01* (2006.01)
(Continued)

(52) U.S. Cl.
CPC .......... *G02B 27/0101* (2013.01); *B60K 35/00* (2013.01); *H04N 5/74* (2013.01);
(Continued)

(58) Field of Classification Search
CPC .......... G02B 27/0101; G02B 2027/011; G02B 2027/013; G02B 2027/014; G02B 2027/0132; H04N 9/3185; B60K 35/00
(Continued)

(56) References Cited

U.S. PATENT DOCUMENTS 5,734,357 A    3/1998  Matsumoto
6,416,186 B1 *  7/2002  Nakamura ............... H04N 5/74
                                                    348/E5.137

(Continued)

FOREIGN PATENT DOCUMENTS

DE          103 34 720 A1    3/2005
DE    10 2005 037 797 A1    2/2007
(Continued)

OTHER PUBLICATIONS

International Search Report and Written Opinion of the International Search Report for PCT/JP2015/058118 dated Jun. 23, 2015.
(Continued)

*Primary Examiner* — Prabodh M Dharia
(74) *Attorney, Agent, or Firm* — Kenealy Vaidya LLP (57) ABSTRACT

A vehicle display device according to the present invention includes a projecting direction changing mechanism that can adjust a light projecting direction in which display light including a certain image is emitted and a display control unit that changes a correction pattern for correcting the shape of the image according to the projecting direction adjusted by the projecting direction changing mechanism and corrects the shape of the image based on the correction pattern. With the vehicle display device according to the present invention, the display light including the shape of the image corrected by the display control unit is emitted and guided to a windshield, so that the display light reflected on the surface of the windshield is visually recognized.

7 Claims, 6 Drawing Sheets

(51) Int. Cl.
*B60K 35/00* (2006.01)
*H04N 5/74* (2006.01)
*H04N 9/31* (2006.01)

(52) U.S. Cl.
CPC ..... *H04N 9/3185* (2013.01); *G02B 2027/011* (2013.01); *G02B 2027/013* (2013.01); *G02B 2027/014* (2013.01); *G02B 2027/0132* (2013.01)

(58) Field of Classification Search
USPC .......... 345/7, 8; 340/439; 701/532; 359/630; 1/1
See application file for complete search history.

(56) References Cited

U.S. PATENT DOCUMENTS

| | | | |
|---|---|---|---|
| 2002/0089756 A1 | 7/2002 | Aoki et al. | |
| 2007/0188407 A1* | 8/2007 | Nishi | F16M 11/10 345/8 |
| 2008/0068296 A1 | 3/2008 | Lind et al. | |
| 2008/0112058 A1* | 5/2008 | Matsushita | G02B 27/0101 359/630 |
| 2009/0005961 A1* | 1/2009 | Grabowski | G01C 21/365 701/532 |
| 2010/0039351 A1* | 2/2010 | Nishi | F16M 11/10 345/7 |
| 2010/0103077 A1* | 4/2010 | Sugiyama | G02B 27/017 345/8 |
| 2011/0267700 A1 | 11/2011 | Schliep et al. | |
| 2012/0086808 A1* | 4/2012 | Lynam | B60K 35/00 348/148 |
| 2013/0242404 A1* | 9/2013 | Kobayashi | G02B 27/0101 359/630 |
| 2014/0132407 A1* | 5/2014 | Kumai | G08G 1/0962 340/439 |
| 2014/0253821 A1 | 9/2014 | Takatoh et al. | |
| 2015/0301338 A1* | 10/2015 | Van Heugten | G02C 7/04 345/8 |
| 2016/0048017 A1* | 2/2016 | Kasahara | G02B 27/0101 359/633 |

FOREIGN PATENT DOCUMENTS

| | | |
|---|---|---|
| DE | 10 2007 001 266 A1 | 7/2008 |
| JP | 11-30764 A | 2/1999 |
| JP | 2002-205571 A | 7/2002 |
| JP | 3727078 B2 | 12/2005 |
| JP | 2006-119384 A | 5/2006 |
| JP | 2012-507426 A | 3/2012 |
| JP | 2013-86691 A | 5/2013 |
| JP | 2013-160841 A | 8/2013 |
| JP | 2013-178308 A | 9/2013 |
| JP | 2013-180713 A | 9/2013 |

OTHER PUBLICATIONS

Japanese Office Action for the related Japanese Patent Application No. 2014-056710 dated Sep. 19, 2017.

* cited by examiner

VEHICLE DISPLAY DEVICE

CROSS-REFERENCE TO RELATED APPLICATION

This application is a continuation application of International Application PCT/JP2015/058118, filed on Mar. 18, 2015, and designating the U.S., the entire contents of which are incorporated herein by reference.

BACKGROUND OF THE INVENTION

1. Field of the Invention

The present invention relates to a vehicle display device for displaying images by using optical reflection on a windshield (a glass window) disposed ahead of a vehicle driver.

2. Description of the Related Art

Common head-up display (HUD) devices for vehicles project display light including various kinds of information to be displayed as an image from an HUD unit onto a reflection board referred to as a front windshield or a combiner and form an optical path in such a manner that the light reflected on the front windshield and the like heads toward the viewpoint of a driver. The driver can visually recognize an image included in the display light emitted from the HUD unit and displayed on the front windshield and the like as a virtual image while visually recognizing the front view of the vehicle through the front windshield. The driver can visually recognize various kinds of information included in the display light emitted from the HUD unit while keeping usual driving conditions without moving the sightline.

With devices such as an HUD device that make various kinds of information included in display light visually recognized by using optical reflection on the surface of a windshield, the driver may visually recognize a distorted image. Optical reflection caused on the surface of an inclined windshield deforms the shape of the image. The gently curved surface shape of the windshield further distorts the image. The curvature and the inclination angle to the horizontal surface (or the vertical surface) are different between positions on the windshield, and the differences cause various kinds of distortion different depending on the positions where the display light is projected on the image visually recognized by the driver. Such distortion exert disadvantageous effects on the visually recognized image.

In this point of view, techniques for correcting distortion of an image in a vehicle HUD device have been developed (see Japanese Patent Application Laid-open No. 11-30764 and Japanese Patent Application Laid-open No. 2002-205571).

The display device of Japanese Patent Application Laid-open No. 11-30764 has a manual operation switch movable upward and downward. The device is configured such that an image is corrected with a manual operation of the switch. In such a case with a virtual image curved with its lateral dimension narrowing to the top or narrowing to the bottom, the image can be corrected by operating the switch.

The vehicle display device of Japanese Patent Application Laid-open No. 2002-205571 uses a coordinate conversion table for correcting distortion of a display image. The display device store the coordinate conversion table in a replaceable external read only memory (ROM) or non-volatile memory.

With the technique of Japanese Patent Application Laid-open No. 11-30764, distortion of an image resulting from the surface shape of the windshield or other factors can be corrected by operating the manual operation switch as necessary. With the technique of Japanese Patent Application Laid-open No. 2002-205571, distortion of a display image can be corrected by replacing the external ROM or rewriting the coordinate conversion table of the non-volatile memory.

However, the position of a viewpoint changes depending on the body size of a driver, the seat position, the posture of the driver, and other factors. The optical path, on which the display light heading toward the viewpoint travels, is accordingly changed. The change in the optical path changes the distortion level of the image.

With the technique of Japanese Patent Application Laid-open No. 11-30764, if a driver wants to visually recognize an image always in a distortion-free state, the driver needs to frequently operate the switch upon a change in the position of the viewpoint. With the technique of Japanese Patent Application Laid-open No. 2002-205571, it is necessary to replace the external ROM or rewrite the content in the non-volatile memory every time a distortion is caused on the image due to a change in the position of the viewpoint. Techniques of Japanese Patent Application Laid-open No. 11-30764 and Japanese Patent Application Laid-open No. 2002-205571 require quite complicated operations for drivers trying to visually recognize an image always in a distortion-free state.

SUMMARY OF THE INVENTION

To overcome the above-described disadvantages, it is an object of the present invention to provide a vehicle display device with an improved operability for correcting distortion caused on a display image visually recognized by a driver.

To achieve the above-described objective, a vehicle display device according to one aspect of the present invention includes a projecting direction changing mechanism configured to be capable of adjusting a light projecting direction in which display light including a certain image is emitted; and a display control unit configured to change a correction pattern for correcting a shape of the image based on a projecting direction adjusted by the projecting direction changing mechanism and correct the shape of the image based on the correction pattern; wherein the display light including the shape of the image corrected by the display control unit is emitted and guided to a windshield, so that the display light reflected on a surface of the windshield is visually recognized.

According to another aspect of the present invention, in the vehicle display device, it is preferable that the display control unit is configured to have a plurality of correction patterns, select one correction pattern from the correction patterns according to a segment corresponding to an eye level of a driver specified based on the projecting direction adjusted by the projecting direction changing mechanism, and correct the shape of the image based on the correction pattern.

According to still another aspect of the present invention, in the vehicle display device, it is preferable that the display control unit is configured to have a plurality of kinds of the correction patterns corresponding to a change in the image caused due to variations in a shape and a size of the windshield, and correct the shape of the image based on the correction patterns specified out of the plurality of kinds.

The above and other objects, features, advantages and technical and industrial significance of this invention will be better understood by reading the following detailed descrip-

DETAILED DESCRIPTION OF THE PREFERRED EMBODIMENTS

Embodiment

An embodiment relating to a vehicle display device of the present invention will now be described in detail with reference to the drawings.

Summary of the Device Configuration

Figure 1:
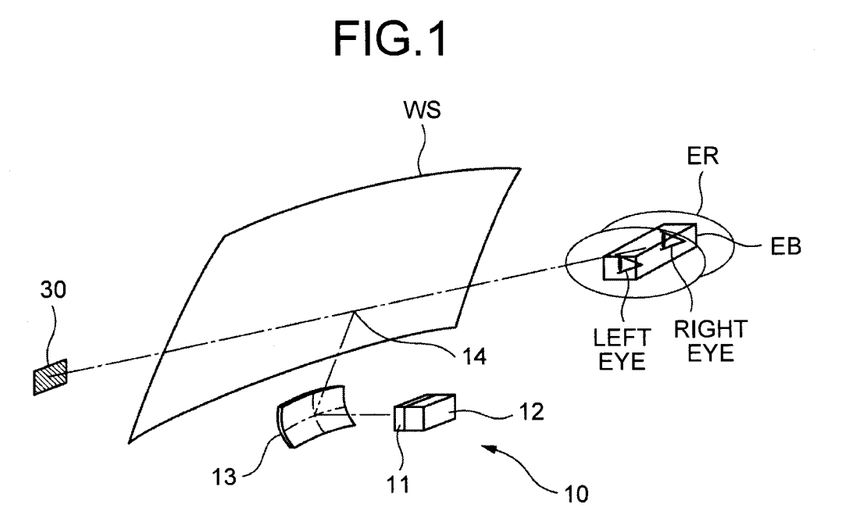
FIG. 1 is a perspective view that illustrates a detailed example of a positional relation between main components of a vehicle display device.
Figure 2:
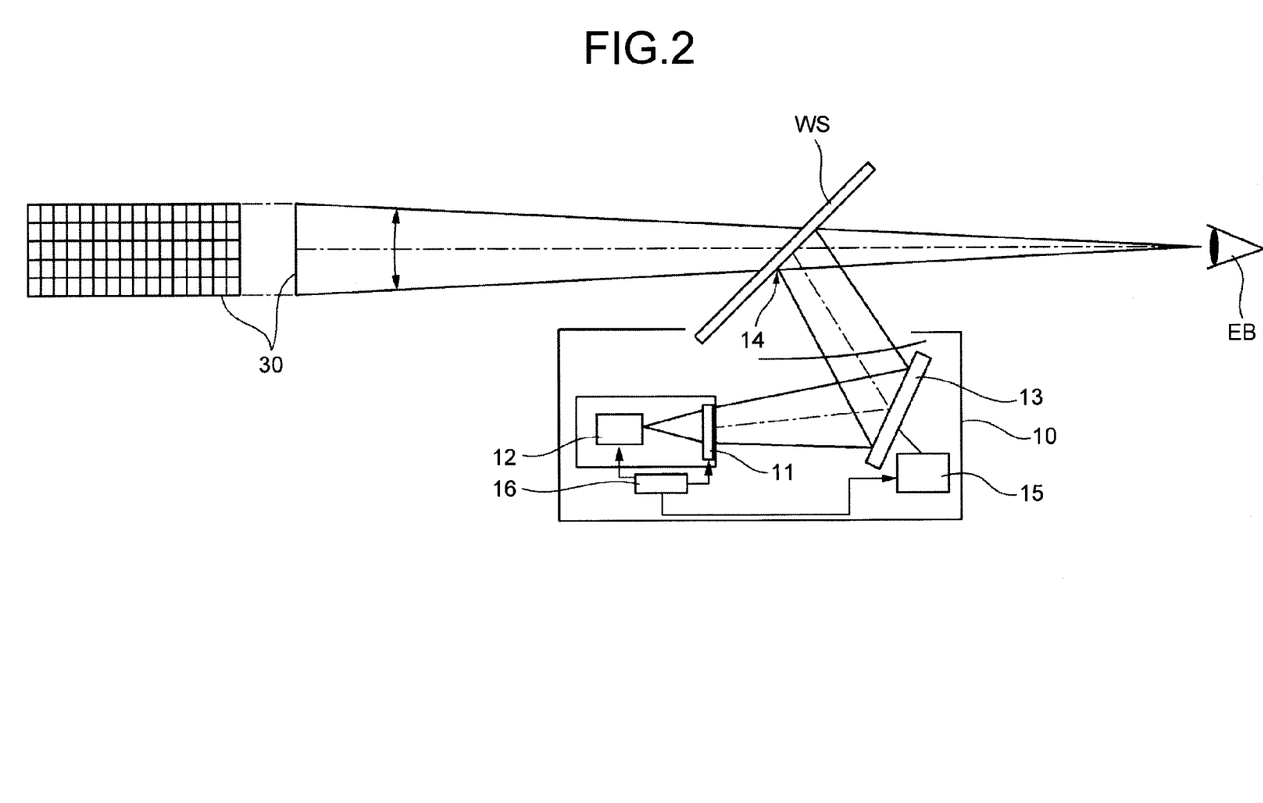
FIG. 2 is a vertical sectional view that illustrates a structural component of a head-up display (HUD) unit and an optical path of a light projected from the HUD unit.

FIGS. 1 and 2 illustrate the vehicle display device according to the present embodiment and related main components. In FIGS. 1 and 2, the vehicle display device according to the present invention corresponds to a head-up display (HUD) unit 10.

The HUD unit 10 is accommodated inside a dashboard of a vehicle and is configured to emit a light upward from an opening formed on a part of the top surface of the dashboard.

A liquid crystal display panel 11, a backlight 12, an aspherical mirror 13, a projecting direction changing mechanism 15, and a display control unit 16 are included in the HUD unit 10 illustrated in FIGS. 1 and 2.

The liquid crystal display panel 11 is a transparent liquid crystal display with a rectangular display surface configured with a plurality of pixels aligned in the height and the width directions. On the liquid crystal display panel 11, various kinds of controls relating to, for example, a display on/off status, display colors, and the contrast density can be made for each pixel in response to an instruction from the later-described display control unit 16.

The backlight 12 is a light source disposed in the back surface side of the liquid crystal display panel 11 and irradiates illumination light necessary for projecting a display image toward the liquid crystal display panel 11. The light source of the backlight 12 has enough illuminating capability to project a display image as far as a comparatively distant position. Emission of the illumination light from the backlight 12 onto the liquid crystal display panel 11 is controlled in response to an instruction from the later-described display control unit 16.

The aspherical mirror 13 reflects a light entering from the liquid crystal display panel 11 side on its surface and emits the light toward a windshield (a transparent glass window) WS side. The aspherical mirror 13 has an optical property to form an image in a certain distant position.

The projecting direction changing mechanism 15 supports the aspherical mirror 13 in a manner capable of adjusting the inclination angle of the surface of the aspherical mirror 13. For example, the inclination angle of the aspherical mirror 13 can be changed as necessary by driving the projecting direction changing mechanism 15 with an electric motor (not illustrated). A change in the inclination angle of the aspherical mirror 13 changes the direction of a light emitted from the HUD unit 10. Adjustment of the inclination angle of the surface of the aspherical mirror 13 using the projecting direction changing mechanism 15 is controlled in response to an instruction from the later-described display control unit 16.

The display control unit 16 displays an image to be displayed on the display surface of the liquid crystal display panel 11. For example, the display control unit 16 acquires information on the current velocity (km/h) of a vehicle and graphically draws visible information including a letter pattern and the like corresponding to the numerical value indicating the velocity on the two-dimensional plane of the display surface. The display control unit 16 may serve as an image processing unit for correcting distortion of an image and the like caused due to the property of an optical system member of the vehicle display device. The display control unit 16 is connected with the above-described liquid crystal display panel 11, backlight 12, and projecting direction changing mechanism 15 and controls operations of these mechanisms by outputting instructions to the mechanisms. As a hardware configuration of the display control unit 16, the display control unit 16 is composed of a central processing unit (CPU) serving as a control unit mainly performing calculation processing, a memory (such as a random access memory (RAM) and a read only memory (ROM)) serving as a storage unit storing therein programs and information, an input and output interface, and other components. The configuration is the same as that of a known personal computer, and detailed description will be therefore omitted. The storage unit of the display control unit 16 stores therein information including, as described later, a pattern of uncorrected display data, a plurality of kinds of correction patterns used in image processing, a pattern of corrected display data, and others. The display control unit 16 is connected with an engine control unit (ECU) (not illustrated) serving as a control unit for controlling the vehicle in a communicable manner and is capable of acquiring various kinds of information (such as the vehicle velocity) indicating travel conditions of the vehicle.

Summary of the Optical Path

In use of the HUD unit 10 illustrated in FIGS. 1 and 2, display light including, as visible information, an image displayed on the display surface of the liquid crystal display panel 11 by the illumination light from the backlight 12 enters the aspherical mirror 13. The light reflected on the aspherical mirror 13 is emitted toward the windshield (WS). The light is reflected on an irradiation area 14 on the windshield WS and is projected toward an eye box EB (see FIG. 1), which is a box space including assumed positions of eyes (viewpoint) of the driver.

With this configuration, the driver can visually recognize an image, which is equivalent to the visible information displayed on the display surface of the liquid crystal display panel 11, on the windshield WS. This process is actually caused by projecting an image using reflection on the surface of the windshield WS. A display image 30 visually recognized in the position of the eye box EB is thus an image formed as a virtual image and is visually recognized as if the image exists in a position, for example, about two meters ahead of the windshield WS, as illustrated in FIGS. 1 and 2.

The display image 30 formed by projection by the HUD unit 10 can be visually recognized in the region of an eye range ER (see FIG. 1), which is a space larger than the eye box EB and includes the eye box EB in its inner space. When the height of the region of the eye range ER changes, for example, due to adjustment of the seat height or a difference in the body size between drivers, it is possible to cope with the change by changing the inclination angle of the aspherical mirror 13. In this case, the display control unit 16 outputs an instruction to the projecting direction changing mechanism 15 in response to an operation of the driver input through an operation switch (not illustrated) and the like provided to the HUD unit 10. In response to the instruction, the projecting direction changing mechanism 15 controls to change the inclination angle of the aspherical mirror 13. The direction of a light emitted from the HUD unit 10 is changed according to the change in the inclination angle of the aspherical mirror 13. As a result, the irradiation area 14 on the windshield WS is changed, which accordingly changes the projecting direction of the light reflected on the irradiation area 14. The height of the eye range ER can be thus changed.

In this embodiment, the inclination angle of the aspherical mirror 13 is variable. In another way, the HUD unit 10 as a whole may incline relative to the vehicle in a variable manner with the aspherical mirror 13 fixed to the HUD unit 10. Furthermore, by configuring the HUD unit 10 in a manner movable in the longitudinal direction with respect to the vehicle travel direction, the position where the HUD unit 10 emits a light can be changed. The irradiation area 14 changes with this move, whereby changing the assumed height of the eye range ER.

Description of Image Distortion

In a planar view of the optical path, the windshield WS is not perpendicularly disposed to the optical path but is inclined thereto. The windshield WS generally has a gently curved surface shape with the curvature slightly varying depending on positions on the windshield WS. Even if the HUD unit 10 projects a rectangular image, a distorted display image is actually visually recognized.

Description of the Principal for Correcting Distortion of the Display Image 30

Figure 3:
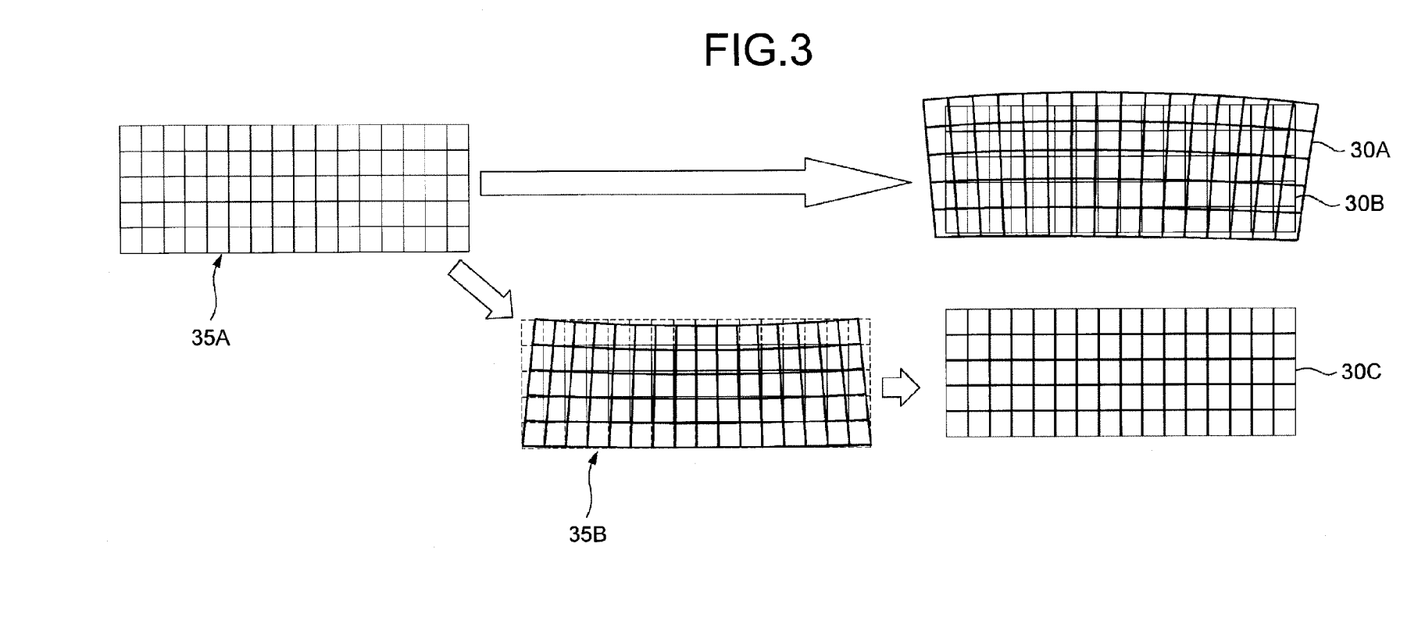
FIG. 3 is a schematic view that illustrates examples of uncorrected and corrected display shapes.

FIG. 3 illustrates detailed examples of uncorrected and corrected shapes of display images. In the examples of FIG. 3, the pattern of uncorrected display data 35A is illustrated as a lattice shape with lines drawn in the height and the width directions at equal distances inside a rectangular outer frame.

When the pattern of the uncorrected display data 35A is displayed on the liquid crystal display panel 11 without correction, depending on the shape of the irradiation area 14 on the windshield WS or other effects, distortion in such a shape of a display image 30A of FIG. 3 is caused on the image visually recognized by the driver. In this case, the display image 30A needs to be corrected into the shape of a display image 30B, the same shape as the pattern of the uncorrected display data 35A.

In this case, a corrected display data 35B is generated by transforming coordinates of the uncorrected display data 35A, and the pattern of the corrected display data 35B is displayed on the liquid crystal display panel 11. Because the pattern of the corrected display data 35B is distorted in an exactly opposite manner to the distortion of the display image 30A, both types of distortion cancel each other. A display image 30C visually recognized by the driver is thus identical to the uncorrected display data 35A and has no distortion.

Description of Data Necessary for Correcting Distortion of the Display Image 30

The method described in "Description of the principal for correcting distortion of the display image 30" eliminates distortion from the display image 30; however, types of distortion are different depending on the sightline level of a driver, and the distortion is thus less likely to be eliminated with only a single correction pattern for correcting distortion. To properly correct distortion of the display image 30 caused due to a difference in the height of the eye range ER, it is necessary to prepare different correction patterns corresponding to respective segments by the height of the eye range ER. In the embodiment, the height of the eye range ER is classified into any of five segments Hr1, Hr2, Hr3, Hr4, and Hr5, and five kinds of correction patterns are prepared in a manner corresponding to the respective segments. In the embodiment, the case with segments in five grades is described; however, the number of segment grades in the present invention is not limited to five but may be equal to or greater than two. In this case, the number of prepared correction patterns corresponds to the number of grades.

Considering the variation between the windshields WS caused in the manufacturing process, the following four kinds of correction patterns are prepared to correct the uncorrected display data 35A and generate corrected display data 35B.

Figure 4:
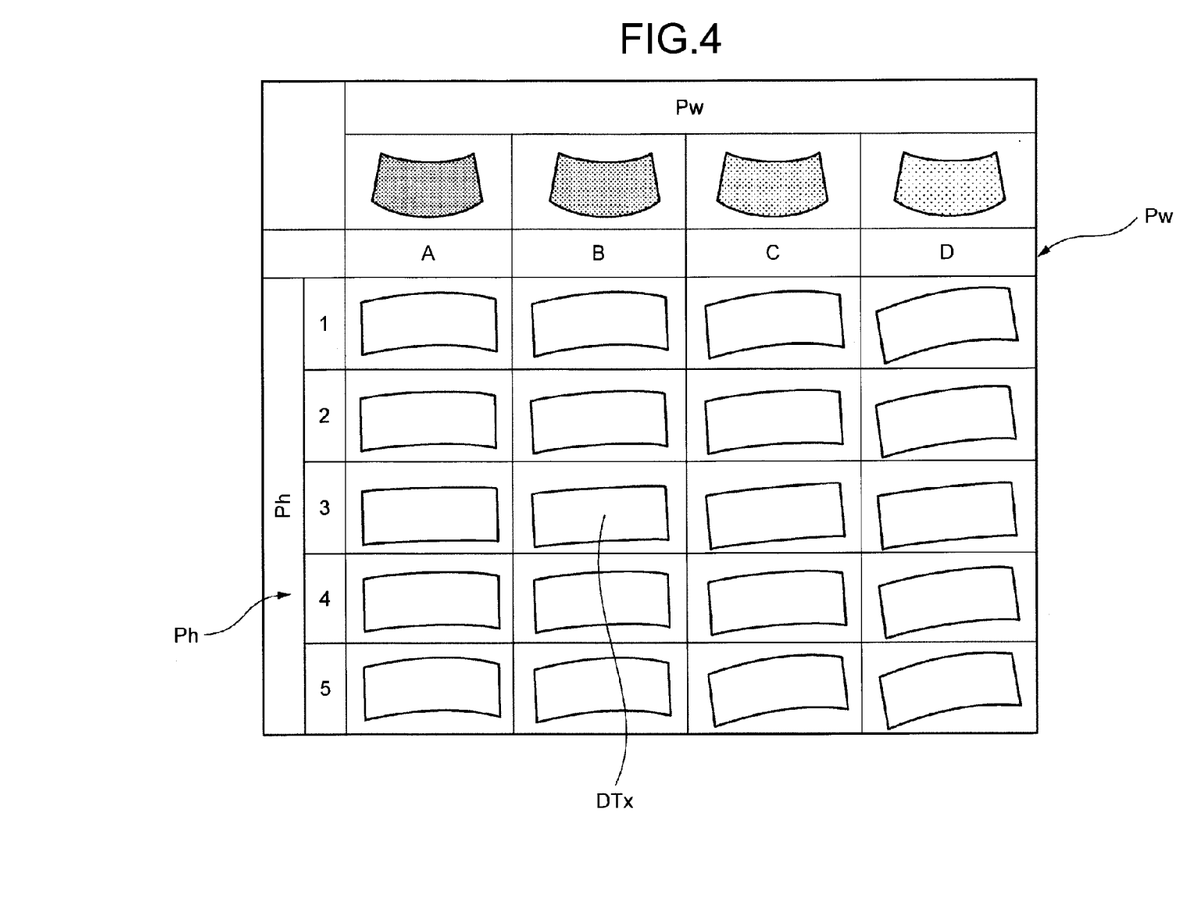
FIG. 4 is a schematic view that illustrates relations between shapes of a plurality of correction pattern data and parameters stored in a database.

(A) A desired correction pattern when no manufacturing variations (B) A correction pattern considering distortion resulting from the manufacturing variation (C) A correction pattern considering rotation resulting from the manufacturing variation (D) A correction pattern considering a difference in size resulting from the manufacturing variation A database DB1 provided in the display control unit 16 and serving as a storage unit stores, as data, 20 kinds of correction patterns ([five kinds of correction patterns (the height direction of FIG. 4) based on the segments by the height of the eye range ER]×[four kinds of correction patterns (the width direction of FIG. 4) based on the manufacturing variation between the windshields WS]) as illustrated in FIG. 4. In using the database DB1, any one of correction pattern data, which is specified based on the combination of a parameter Pw indicating the kind of manufacturing variation between the windshields WS and a parameter Ph indicating a segment by the height of the eye range ER, can be selected from the 20 kinds of correction patterns.

Description of an Exemplary Control of the Vehicle Display Device

Figure 5:
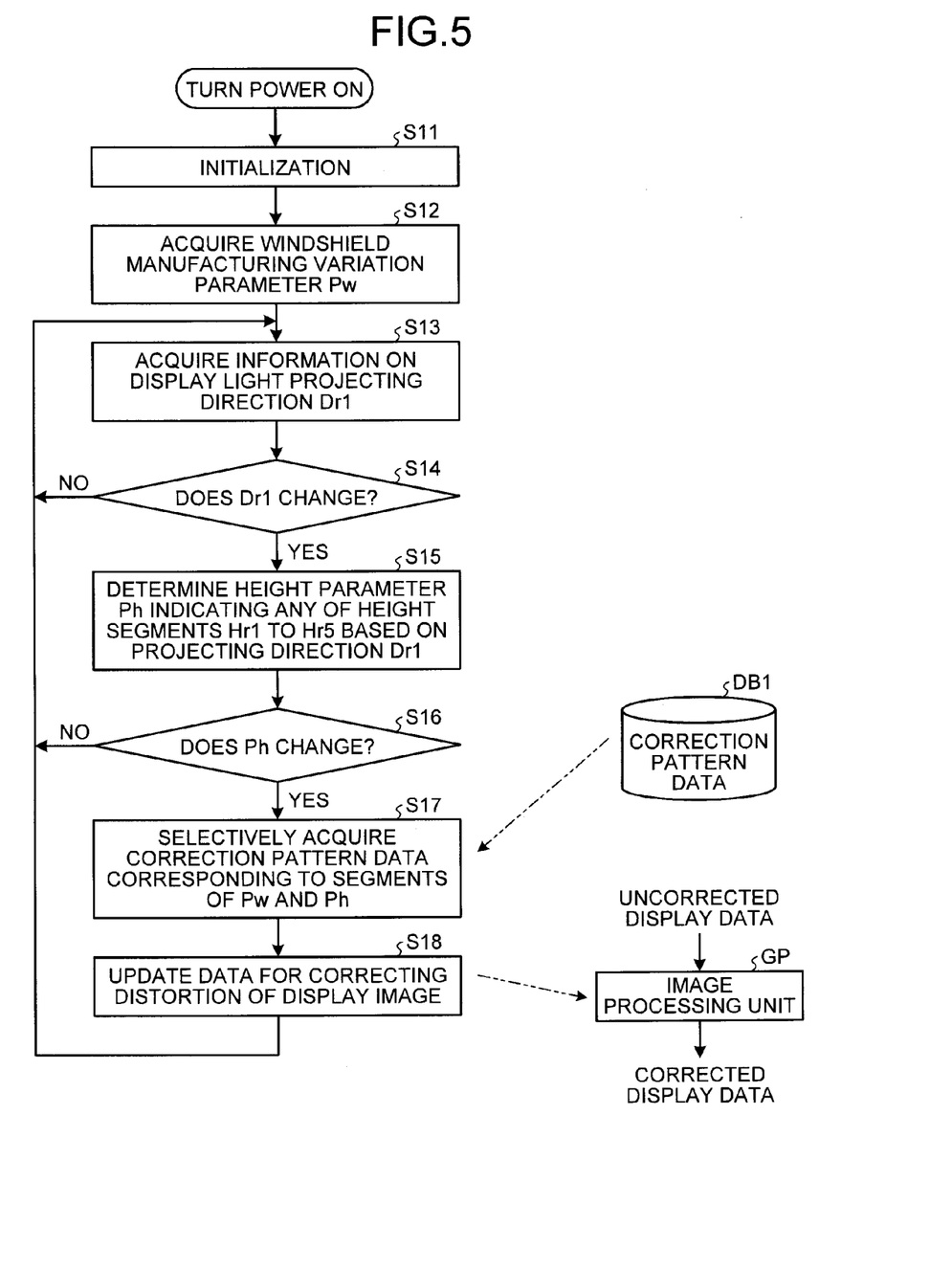
FIG. 5 is a flowchart that illustrates a procedure of a main control of the vehicle display device in an embodiment of the present invention.
Figure 6A:
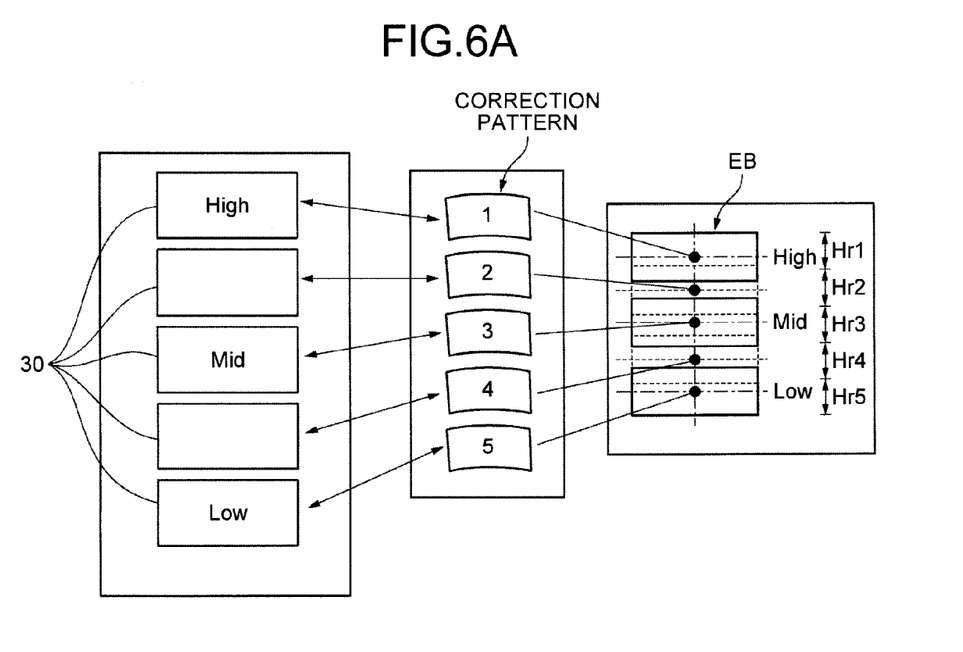
FIG. 6A is a schematic view that illustrates correspondence between segments in the height direction of an eye box, correction pattern shapes in image processing, and shapes of visually recognized display images.
Figure 6B:
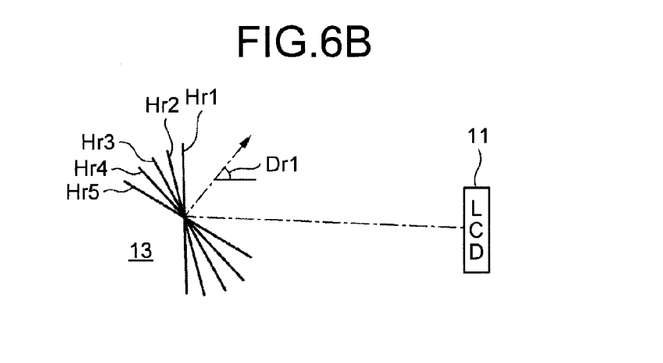
FIG. 6B is a schematic view that illustrates correspondence between segments in the height direction of the eye box, correction pattern shapes in image processing, and shapes of visually recognized display images.

FIG. 5 illustrates the content of a main control of the vehicle display device in the present embodiment. FIG. 5 is a flowchart that illustrates a procedure in which the display control unit 16 transforms coordinates on display data displayed on the liquid crystal display panel 11 so as to correct distortion. FIGS. 6A and 6B illustrate correspondence between the segments in the height direction of the eye box EB, the shapes of correction patterns in the image processing, and the shapes of display images visually recognized.

When the power is turned on, the display control unit 16 executes predetermined initialization at Step S11. Specifically, the display control unit 16 secures a communication line to acquire various kinds of information (such as the vehicle velocity) to be displayed from other control units (not illustrated) such as an engine control unit (ECU) and to have information constantly updated in the latest condition. Furthermore, the display control unit 16 transmits a command so that a graphic processor GP, which serves as a control unit drawing the content to be displayed on the screen of the liquid crystal display panel 11, can execute a predetermined operation. The display control unit 16 reads the database DB1 for default correction pattern data and provides the data to an image processing unit transforming coordinates in the graphic processor.

The display control unit 16 acquires the parameter Pw relating to the manufacturing variation between the windshields WS at Step S12. The manufacturing variation parameter Pw may be associated with the status of an operation switch (not illustrated) connected to the display control unit 16 or may be registered in a certain non-volatile memory as variable data.

The manufacturing variation parameter Pw is adjusted to the optimum value based on the conditions of the windshield WS actually installed to a vehicle at places such as a production site of cars and a car dealer.

At Step S13, the display control unit 16 acquires information about a projecting direction Dr1 (see FIG. 6B) of display light, for example, from a sensor (not illustrated) connected to the projecting direction changing mechanism 15. In other words, the display control unit 16 detects the projecting direction Dr1 changing with a change in the inclination angle of the aspherical mirror 13. If the display control unit 16 detects a change in the projecting direction Dr1 at Step S14 (Yes at Step S14), the process proceeds to the next processing of Step S15. If the display control unit 16 detects no changes in the projecting direction Dr1 at Step S14 (No at Step S14), the process returns to the processing of Step S13.

The projecting direction Dr1 changes in correspondence with a change in the height direction of the eye box EB.

At Step S15, the projecting direction Dr1 is compared with a plurality of thresholds to determine to which segment of segments Hr1, Hr2, Hr3, Hr4, and Hr5 in the height direction of the eye box EB the projecting direction Dr1 belongs. The result is defined as the height parameter Ph. If a change in the height parameter Ph from the previous result is detected at Step S16 (Yes at Step S16), the process proceeds to the next processing of Step S17. If the height parameter Ph is determined to be unchanged from the previous result at Step S16 (No at Step S16), the process returns to the processing of Step S13. As FIG. 6A illustrates, the position of the eye box EB in the height direction sequentially lowers in the order of segments Hr1, Hr2, Hr3, Hr4, and Hr5.

At Step S17, the display control unit 16 acquires a piece of correction pattern data corresponding to the above-described two parameters Pw and Ph from the database DB1. For example, if the manufacturing variation parameter Pw is "B" and the height parameter Ph is "3", the display control unit 16 selects correction pattern data DTx illustrated in FIG. 4.

At Step S18, the display control unit 16 updates correction pattern data used for coordinate transformation by the image processing unit in the graphic processor GP to the correction pattern data having been last selected at Step S17.

When the control illustrated in FIG. 2 is performed, as illustrated in FIGS. 6A and 6B, with a change between the segments in the height direction of the eye box EB, the correction pattern is automatically changed to a pattern corresponding to the segment. The display image 30 is therefore formed to be visually recognized in a distortion-free state in any height. Distortion resulting from the manufacturing variation between the windshields WS can be more accurately modified by separately selecting the manufacturing variation parameter Pw for each windshield WS. With this configuration, a driver does not need to make any special operations on distortion of the display image 30, which improves the operation performance. Furthermore, the manufacturing variation parameter Pw only needs to be selected from a plurality of kinds of predetermined patterns, thereby completing the adjustment with an easy operation.

Possibility of Deformation

The HUD unit 10 illustrated in FIGS. 1 and 2 projects an image with the aspherical mirror 13 disposed in the middle of the optical path; however, the HUD unit 10 can be configured without using the aspherical mirror 13. In the case without using the aspherical mirror 13, the projecting direction of an image can be changed in a manner corresponding to a change in the height direction of the eye box EB by, for example, adjusting the inclination angle of the HUD unit 10 as a whole or adjusting the position of the HUD unit 10 in the longitudinal direction.

In addition, the HUD unit 10 illustrated in FIGS. 1 and 2 detects the projecting direction Dr1 based on the inclination angle of the aspherical mirror 13 disposed in the middle of the optical path, determines to which segment of segments Hr1, Hr2, Hr3, Hr4, and Hr5 the projecting direction Dr1 belongs, and accordingly changes the correction pattern; however, another control may be applied. For example, such a method is applicable that, using correspondence between the image projecting direction of the HUD unit 10 and the actual position (level) of the eyes of the driver, detects the position of the eyes of the driver with a camera and changes the correction pattern based on the actual eye level. In the case with an operation switch or the like for adjusting the projecting direction based on the actual eye level, the correction pattern may be changed according to the operation status of the switch. In any kinds of control, the direction in which an image is projected from the HUD unit 10 is eventually changed according to the level of the eye box EB, and the correction pattern is automatically changed accordingly.

As described above, with the vehicle display device according to the present embodiment, the correction pattern is automatically changed when the projecting direction of a projecting direction changing mechanism is adjusted with a change in the eye level of the driver. With this configuration, even when the eye level of the driver has changed with a change in the posture and the like, distortion caused on the visually recognized image is automatically corrected without having the driver make an operation to correct the distortion. Consequently, this configuration improves the operation performance in correcting distortion caused on a display image visually recognized by a driver.

With the vehicle display device according to the present embodiment, any one of correction patterns is selected based on the segment corresponding to the eye level of a driver, and distortion caused on a visually recognized image is automatically corrected. This manner exerts advantageous effects in correcting distortion caused on a display image with a simple configuration and can reduce the capacity of correction pattern data necessary for correction.

With the vehicle display device according to the present embodiment, even when distortion is caused that results from the variation between windshields such as differences in shape and size caused during the manufacturing process, the display image can be less distorted by selecting the optimal correction pattern from a plurality of correction patterns.

With the vehicle display device according to the present invention, an operability is improved for correcting distortion caused on a display image recognized by a driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device for emitting display light and guiding the display light to a windshield of a vehicle, the display light including an image having a shape, the display device comprising:
    a projecting direction changing mechanism configured to adjust a light projecting direction in which the display light is emitted and guided to the windshield; and
    a display control unit configured to change a correction pattern for correcting the shape of the image based on the projecting direction when the projection direction is adjusted by the projecting direction changing mechanism and correct the shape of the image based on the correction pattern; wherein
    the display light including the shape of the image corrected by the display control unit is emitted and guided to the windshield, so that the display light reflected on a surface of the windshield is visually recognized.

2. The vehicle display device according to claim 1, wherein
    the display control unit is configured to have a plurality of correction patterns, select one correction pattern from the correction patterns according to a segment corresponding to an eye level of a driver specified based on the projecting direction adjusted by the projecting direction changing mechanism, and correct the shape of the image based on the correction pattern.

3. The vehicle display device according to claim 2, wherein
    the display control unit is configured to have a plurality of kinds of the correction patterns corresponding to a change in the image caused due to variations in a shape and a size of the windshield, and correct the shape of the image based on the correction patterns specified out of the plurality of kinds.

4. The vehicle display device according to claim 1, wherein
    the display control unit is configured to generate an uncorrected pattern that includes data of the image arranged according to predetermined coordinates, and
    the display control unit is configured to correct the shape of the image by transforming the predetermined coordinates of the uncorrected pattern based on the corrected pattern.

5. The vehicle display device according to claim 1, wherein
    the windshield reflects the display light such that the windshield causes a distortion of the shape of image; and
    the display control unit corrects the shape of the image by distorting the image in an opposite manner to the distortion caused by the windshield such that the display light reflected on the surface of the windshield is visually recognized without the distortion caused by the windshield.

6. The vehicle display device according to claim 1, further comprising:
    a display panel configured to emit the display light; wherein
    the display control unit is configured to command the display panel to emit the display light based on the shape of the image corrected by the display control unit.

7. The vehicle display device according to claim 6, further comprising:
    a mirror movably connected to the projecting direction changing mechanism and positioned relative to the display panel to receive the display light emitted by the display panel and to reflect the display light to the windshield.

* * * * *